United States Patent
Russell et al.

(10) Patent No.: US 9,992,732 B2
(45) Date of Patent: Jun. 5, 2018

(54) OPERATION OF MACHINE-TYPE COMMUNICATION DEVICES

(71) Applicant: VODAFONE IP LICENSING LIMITED, Newbury, Berkshire (GB)

(72) Inventors: Nick Russell, Newbury (GB); Christopher David Pudney, Newbury (GB); Gavin Wong, Newbury (GB); Peter Robert Dawes, Newbury (GB); Robert Banks, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days. days.

(21) Appl. No.: 15/089,139

(22) Filed: Apr. 1, 2016

(65) Prior Publication Data
US 2016/0360471 A1 Dec. 8, 2016

Related U.S. Application Data

(63) Continuation of application No. 13/100,491, filed on May 4, 2011, now abandoned.

(30) Foreign Application Priority Data

May 4, 2010 (GB) .................................. 1007397.1

(51) Int. Cl.
*H04W 4/00* (2018.01)
*H04W 48/12* (2009.01)
(Continued)

(52) U.S. Cl.
CPC ........... *H04W 48/12* (2013.01); *H04W 4/005* (2013.01); *H04W 8/02* (2013.01); *H04W 48/02* (2013.01); *H04W 60/04* (2013.01); *H04W 8/06* (2013.01)

(58) Field of Classification Search
CPC ....... H04W 4/005; H04W 60/00; H04W 4/00; H04W 4/08; H04W 8/22; H04W 92/18;
(Continued)

(56) References Cited

U.S. PATENT DOCUMENTS 7,693,506 B1 4/2010 Back
2004/0162071 A1 8/2004 Grilli
(Continued)

OTHER PUBLICATIONS

Office Action issued in U.S. Appl. No. 13/100,491 dated Oct. 2, 2015.
(Continued)

*Primary Examiner* — Fred Casca
(74) *Attorney, Agent, or Firm* — Workman Nydegger

(57) ABSTRACT

The invention relates to operating a Machine-Type Communication (MTC) device for communication with a cellular radio network. A transmission is made from the MTC device to the cellular radio network to register the MTC device with the cellular radio network. The transmission includes a message from the MTC device to the cellular radio network, identifying the MTC device as an MTC device to the cellular radio network. Also, the MTC device has an associated HPLMN. An instruction is received at the MTC device from the network not to make a transmission from the MTC device for accessing the network. The instruction specifies a criteria for the MTC device's HPLMN or preferred list of networks. The MTC Device compares the criteria with the HPLMN associated with the MTC device and avoids making a transmission to access the network for a period of time based on the result comparing step.

17 Claims, 1 Drawing Sheet

(51) Int. Cl.
*H04W 60/04* (2009.01)
*H04W 48/02* (2009.01)
*H04W 8/02* (2009.01)
*H04W 8/06* (2009.01)

(58) Field of Classification Search
CPC ..... H04W 60/04; H04W 48/18; H04W 76/02; H04W 8/04; H04W 76/021; H04W 8/06; H04W 8/24; H04L 61/2069; H04M 15/31
USPC ......... 455/435.1, 436, 404.2, 406, 410, 419, 455/450, 451, 563
See application file for complete search history.

(56) References Cited

U.S. PATENT DOCUMENTS

| | | |
|---|---|---|
| 2006/0286979 A1 | 12/2006 | Enderlein |
| 2007/0021113 A1 | 1/2007 | Hamasaki |
| 2008/0004978 A1* | 1/2008 | Rothschild ............. G06Q 30/00 705/26.8 |
| 2008/0155239 A1* | 6/2008 | Chowdhury ........ G06F 15/7842 712/245 |
| 2008/0279131 A1 | 11/2008 | Malladi |
| 2009/0124248 A1 | 5/2009 | Ohnishi |
| 2009/0247165 A1 | 10/2009 | Chen |
| 2009/0298497 A1* | 12/2009 | Lee ........................ H04W 48/08 455/434 |
| 2010/0057485 A1* | 3/2010 | Luft ........................ H04W 4/00 455/411 |
| 2010/0167755 A1 | 7/2010 | Kim |
| 2010/0279676 A1 | 11/2010 | Benn |
| 2010/0279690 A1* | 11/2010 | Buckley .................. H04W 8/18 455/435.2 |
| 2011/0256896 A1* | 10/2011 | Giaretta .................. H04W 4/00 455/509 |
| 2011/0287765 A1 | 11/2011 | Russell et al. |
| 2012/0087362 A1 | 4/2012 | Islam |
| 2012/0088475 A1* | 4/2012 | Portman ............. H04L 12/1831 455/412.1 |
| 2012/0142337 A1* | 6/2012 | Wang ................... H04W 24/04 455/424 |

OTHER PUBLICATIONS

Office Action issued in U.S. Appl. No. 13/100,491 dated Apr. 6, 2015.
Office Action issued in U.S. Appl. No. 13/100,491 dated Jul. 14, 2014.
European Search Report issued in EP11164829.1 dated Dec. 13, 2011.

* cited by examiner

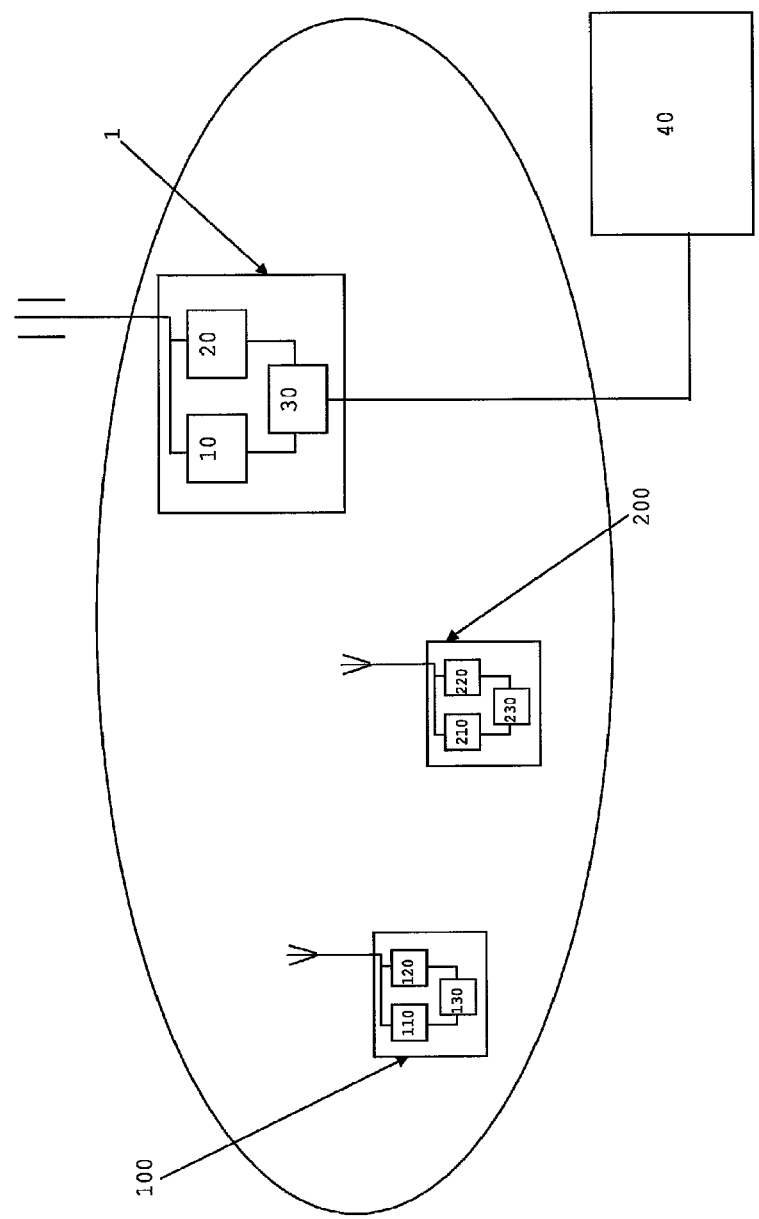

OPERATION OF MACHINE-TYPE COMMUNICATION DEVICES

CROSS REFERENCE TO RELATED APPLICATIONS

This application is a continuation of U.S. patent application Ser. No. 13/100,491, filed on May 4, 2011 and entitled "OPERATION OF MACHINE-TYPE COMMUNICATION DEVICES". U.S. patent application Ser. No. 13/100,491 claims the benefit of and priority to GB Application No. GB1007397.1, filed on May 4, 2010. Both of these applications are hereby expressly incorporated herein in their entirety.

TECHNICAL FIELD OF THE INVENTION

The present invention concerns a method of operating a Machine-Type Communication (MTC) device for communication with a cellular radio network, a method of controlling access by an MTC device to a cellular radio network, an associated MTC device and a method of operating a cellular radio network.

BACKGROUND TO THE INVENTION

Machine Type Communication (MTC) devices (sometimes referred to as Machine-to-Machine or M2M devices) are increasingly being used for a variety of applications. Their numbers are expected to grow at a high rate. MTC devices are typically automated data reporting systems such as utility meters or status reporting devices.

Thus, MTC devices are likely to have significantly different usage or operational characteristics from other types of User Equipment, UE. Such devices may be programmed to send data at a specific time, for example late at night. Also, other types of MTC devices may be triggered by specific events, such as a burglar alarm. Many of these may activated by the same event (for example, a power cut or earthquake). In any event, the volume of data transmitted and received by such devices is often low.

It has conventionally been understood that nearly all MTC devices (or at least 95%) will operate on their home cellular radio network, referred to as the Home Public Land Mobile Network (HPLMN). This is identified by the PLMN-ID of their International Mobile Subscriber Identity (IMSI). The possibility that MTC devices will use another network, also referred to as roaming or using a Visitor Public Land Mobile Network (VPLMN), has been previously considered to be a rare event. It has therefore been thought that network operators would be able to manage the large number of MTC devices by dimensioning their networks accordingly. Hence, MTC devices are generally expected to act and to be treated no differently from any other type of UE. This allows their introduction at minimum cost and without significant increase in network complexity.

The possibility that large numbers of MTC devices may require facilities for roaming has consequently not been considered. However, this possibility presents a significant challenge for network operation and is further described below.

SUMMARY OF THE INVENTION

Against this background, the present invention provides a method of operating a Machine-Type Communication (MTC) device for communication with a cellular radio network, comprising making a transmission from the MTC device to the cellular radio network to register the MTC, device with the cellular radio network. The transmission includes a message from the MTC device to the cellular radio network, identifying the MTC device as an MTC device to the cellular radio network.

Unlike conventional UEs, MTC devices may not always be mobile. Widespread geographical network coverage is therefore desirable. This can be achieved by allowing the MTC device to roam. For example, "international roaming" may be used by providing MTC devices with a Subscriber Identity Module (SIM) from a different country or using a SIM with "non-geographic" Mobile Country Code (MCC), for example 901. In this context, 90% or more MTC devices may be roaming.

The cellular radio network being used by these roaming MTC devices may not anticipate their arrival and the network may become overloaded. It is desirable that UEs that are not MTC devices are not disadvantaged by this development. By causing the MTC device to identify itself as such, the cellular radio network is therefore able to respond to the MTC device in a different way from other UEs, particularly when the MTC device is roaming. This may prevent a large number of roaming MTC devices from causing an overload.

Although the term MTC device is used herein, this is equivalent to the term M2M device. MTC devices may be characterised in that their transmissions are one or more of: low data quantity; data throughput for a short proportion of time; low data rate with low priority; delay-tolerant; and time-controlled.

The message may be a consequence of information stored at the MTC device. For example, an Non-Access Stratum (NAS) Signalling Priority (NAS_SignallingPriority) leaf is stored in the MTC device UE as part of a NAS configuration Management Object (MO) within the Open Mobile Alliance (OMA) Device Management (DM).

In another aspect, there is provided a method of operating a Machine-Type Communication, MTC, device for communication with a cellular radio network, comprising receiving a transmission from the MTC device at the cellular radio network to register the MTC device with the cellular radio network. The transmission includes a message from the MTC device to the cellular radio network, identifying the MTC device as an MTC device to the cellular radio network.

In either aspect, the message from the MTC device to the cellular radio network may further identify the MTC device as a low throughput device to the cellular radio network. In this context, a low throughput device is a device configured to transmit no more than 1 MB of data per day, optionally no more than 750 kB, 500 kB, 250 kB, 100 kB or 50 kB per day.

In the preferred embodiment, the message (information) is comprised in one of: an Intra Domain Non-Access Stratum Node Selector Information Element (for the Universal Mobile Telecommunications System, UMTS); a Location Updating Request message (for GSM circuit switched systems); the Temporary Logical Link Identifier used in a Logical Link Control frame carrying an Attach Request (for GSM packet switched systems); and a Radio Resource Connection establishment message (for UMTS and for Long Term Evolution, LTE, systems using the Enhanced UMTS Terrestrial Radio Access Network, E-UTRAN).

In some embodiments, the cellular radio network is a Visitor Public Land Mobile Network, VPLMN, for the MTC device. As explained above, there are significant advantages to the application of the present invention when an MTC device is roaming. In particular, identification of the device is beneficial when the network is not aware of its application.

In such embodiments, the MTC device may have been registered with a different cellular radio network prior to the step of registering. Then, the step of registering may further comprise one or more of: performing an Attach procedure without performing a Routing Area Update, RAU; and performing a Packet Switch, PS, domain Attach procedure or Circuit Switch, CS, domain Location Update procedure using the International Mobile Subscriber Identity, IMSI, for the MTC device. This advantageously reduces the quantity of signalling required when changing PLMN (for example, in the case of a network failure). Consequently, less burden is placed on the network in these situations.

Optionally, the method further comprises transmitting a command from the cellular radio network to the MTC device to adjust a Periodic Update Timer of the MTC device, in response to the message received by the cellular radio network from the MTC device identifying the MTC device as an MTC device. This prevents the MTC device from checking for network coverage too frequently and causing disruption and unnecessary resource wastage.

In embodiments, the method further comprises: detecting, at the cellular radio network, an overload event in respect of another cellular radio network; transmitting a rejection message from the cellular radio network to the MTC device in response to the detected overload and the message received by the cellular radio network from the MTC device identifying the MTC device as an MTC device. The rejection message may instruct the MTC device to stop transmissions for registering the MTC device with the cellular network. This prevents another overload event, by avoiding the MTC device continuing trying to access the network.

In some embodiments, in which the transmission from the MTC device to register with the cellular radio network comprises a Routing Area Update (RAU) or Tracking Area Update (TAU), the method further comprises: transmitting a Location Update Accept message from the cellular radio network to the MTC device; setting at the SGSN, MME or both a Periodic Routing area Update (PRU) timer for the MTC device; transmitting a further RAU or TAU from the MTC device to the cellular radio network, prior to the step of transmitting a rejection message.

Optionally, the rejection message instructs the MTC device to stop transmissions for registering the MTC device with the cellular network for at least a predetermined time period. In some embodiments, the method further comprises making a transmission from the MTC device to the core network or the radio access network of cellular radio network that allows the cellular radio network to send a rejection message.

In embodiments, the rejection message forms part of signalling from the core network of the cellular radio network to the MTC device.

Preferably, the method further comprises: transmitting a Network Mode of Operation (NMO) indicator from the cellular radio network to the MTC device, the NMO indicator instructing the MTC device to perform combined Packet Switched and Circuit Switched mobility management. More preferably, non-MTC devices perform non-combined (that is, separate) Packet Switched and Circuit Switched mobility management. This provides an improved Gs interface between the SGSN and the MSC for MTC devices. Optionally, the method further comprises selecting a Mobile Switching Centre (MSC) at the cellular radio network in response to the message received by the cellular radio network from the MTC device identifying the MTC device as an MTC device.

Desirably, the MTC device has an associated Home Public Land Mobile Network, HPLMN. Optionally, the method further comprises: receiving an instruction at the MTC device from the cellular radio network not to make a transmission from the MTC device for accessing the cellular network, the instruction specifying a criteria for the MTC device's HPLMN or preferred list of cellular networks; comparing, at the MTC Device, the criteria specified by the instruction with the HPLMN associated with the MTC device; and avoiding making further transmissions from the MTC device to access the cellular radio network for a period of time based on the result of the step of comparing. This enhanced Access Class Barring scheme improves the ability of a network, preferably the VPLMN to provide large numbers of random access channel transmissions from MTC devices, depending on their network assignment.

In a further aspect, the present invention provides a method of controlling access by a Machine-Type Communication (MTC) device to a cellular radio network, the MTC device having an associated Home Public Land Mobile Network (HPLMN). The method comprises: receiving an instruction at the MTC device from the cellular radio network not to make a transmission from the MTC device for accessing the cellular network, the instruction specifying a criteria for the MTC device's HPLMN or preferred list of cellular networks; comparing, at the MTC Device, the criteria specified by the instruction with the HPLMN associated with the MTC device; and avoiding making a transmission from the MTC device to access the cellular radio network for a period of time based on the result of the step of comparing.

The preferred list of cellular networks may typically be stored on a Subscriber Identity Module (SIM) or Universal SIM of the MTC device.

In these cases, the criteria optionally specifies one or more of: that the cellular radio network is the HPLMN associated with the MTC device; that the cellular radio network is an equivalent of the HPLMN associated with the MTC device; and that the preferred list of cellular networks associated with the MTC device comprises the cellular radio network.

The present invention may also be found in a computer program, configured when operated on a processor to carry out the method as described herein. The computer program may be split in its functionality over different logical or geographical entities within or connected to the cellular network. Additionally or alternatively, the present invention may be implemented in any combination of hardware, software, programmable logic or another electronic system.

In yet another aspect, the present invention may reside in a Machine-Type Communication (MTC) device, comprising: a transmitter; and a processor, configured to control the transmitter to make a transmission to the cellular radio network to register the MTC device with the cellular radio network, the transmission including a message identifying the MTC device as an MTC device to the cellular radio network. This device optionally comprises the functionality to carry out any combination of the method steps as described herein.

It will also be understood that the present invention is not limited to the specific combinations of features explicitly disclosed, but also any combination of features that are described independently and which the skilled person could implement together.

BRIEF DESCRIPTION OF THE DRAWINGS

The invention may be put into practice in various ways, a number of which will now be described by way of example only and with reference to the accompanying drawing in which:

FIG. 1 shows a schematic diagram detailing an example configuration of MTC devices in a cellular network.

DETAILED DESCRIPTION OF PREFERRED EMBODIMENTS

Referring first to FIG. 1, there is shown a schematic diagram detailing an example configuration of MTC devices in a cellular network. There is provided: a Radio Access Network (RAN) 1; a first MTC device 100; a second MTC device 200; and a core network 40.

The RAN 1 may be GSM Base Station System (BSS), a UMTS Node B plus Radio Network Controller (RNC), an LTE eNode B or any other cellular network base station device. The base station 1 comprises: a transmitter 10; a receiver 20; and a processor 30. Similarly, the first MTC device 100 is a UE comprising a transmitter 110; a receiver 120; and a processor 130 and the second MTC device 200 is a UE comprising a transmitter 210; a receiver 220; and a processor 130. The processor 30 of the RAN 1 is linked to the core network 40. It will be understood that the RAN 1, first MTC device 100 and second MTC device 200 also comprise other hardware, software or both in order to carry out their functions.

A number of implementations are now described, which are focussed on low usage MTC devices. Low usage may imply one or more of: low data throughput; data throughput for only a small proportion of time; high delay tolerance; and low priority. A high usage MTC device may be functionally equivalent to a low usage device, but it may be handled as any other UE by a VPLMN.

MTC Device Flag

It is desirable for each MTC device to be identified as a low usage MTC device, such that it can self-configure accordingly. The Open Mobile Alliance (OMA) Device Management (DM) may be used to configure the correct set of devices as "low usage MTC devices. In particular, a Non-Access Stratum (NAS) Signalling Priority is stored in the MTC device UE (using the OMA DM) or in the MTC Device USIM and indicates that the MTC device is low usage and for machine-to-machine communication. This can form a leaf in a NAS configuration Management Object (MO) as part of the OMA DM.

MTC Device Identification to Core Network

Moreover, an MTC (or M2M) indication may be added by the MTC devices into the 'core network node selection' signalling that is sent to the RAN nodes. In UMTS, this may be achieved using the Intra Domain NAS Node Selector Information Element (IE) (identified in section 10.3.1.6 of 3GPP TS 25.331). If used with a Mobile Switching Centre (MSC) rather than a • Serving GPRS Support Node (SGSN), the indicator may only be used for the Circuit Switched (CS) domain, but not the Packet Switched (PS) domain. In GSM CS, the signalling may be achieved in the Location Updating Request message, using the (last) spare bit in Mobile Station Classmark 1, or by adding a type 1 information element to the message. In GSM PS, the signalling may be effected in the Logical Link Control (LLC) frame carrying the Attach Request sent to a new PLMN (when changing from one PLMN to another). In this case, the MTC device sets the Temporary Logical Link Identifier (TLLI) to indicate that the UE has no valid Packet Temporary Mobile Station Identity (P-TMSI). In E-UTRAN, the signalling could be added to the Radio Resource Control (RRC) Connection Setup Complete message.

Modern SGSNs and Mobility Management Entities (MMES) should have sufficient memory space to store subscriber records for large numbers of subscribers. For example, the subscriber data is often carried in a couple of old SS7 Insert Subscriber Data (ISD) messages. Then, the total record size per subscriber is probably around 1 kilobyte. 10 million unexpected subscribers then requires a spare 10 Gigabytes of memory to be available. Newer equipment would be expected to have more memory available.

Some MSCs tend to have an older design and could well have memory limitations. However, as newer platforms are available and an operator can uses a large pool of older MSCs together with a small number of newer MSCs. In such a deployment, it would be useful if the Radio Access Network (RAN) nodes could direct low usage MTC devices to the newer MSC hardware. This may be achieved by steering MTC device mobility management signalling to specific nodes in the core network 40.

Overload Control at the MTC Device

When a cell, area of cells, SGSN area, MME area or network becomes overloaded, immediate prioritisation of UEs is highly desirable. Existing solutions suggest that the SGSN or MME reject access attempts from MTC devices. However, it is beneficial to control overload as close to the source as possible, for example at the UE. This may save any signalling being sent over the RAN at all.

Therefore, extending the use of the existing Access Class Barring feature for MTC devices is an improved solution. The Access Class Barring may have indications to bar or permit access for the following categories:
1. MTC device of HPLMN (non-roaming devices);
2. MTC device of equivalent HPLMN;
3. MTC device without VPLMN on preferred list;
4. other MTC devices.

Since each of these values is a subset of the next, it should be possible to encode this information in 2 bits. An efficient encoding of this access class barring information may be desirable so that, for example, it can be included in the GERAN System Information Type 3 (or Type 1) Rest Octets information element.

Return to Previously Failed (V)PLMN

When a roaming SIM is not on the 'most preferred PLMN in that country' list, the UE will periodically perform a background PLMN search to attempt to identify a more preferred PLMN of the same country. In the case of a mobile that has changed network following a failure of the most preferred PLMN, it will be desirable that the mobile does not attempt to return too soon to the old network because:

a) having many devices return after, say, 6 or 12 minutes is liable to prevent the old network from recovering, and b) if the device fails to access the old network, the device is liable to re-attach (and create more load) on a non-preferred network (either the previously used network or a different network).

A minimum value for the background PLMN search timer is therefore transmitted for MTC devices. However, it is recognised that the background PLMN search timer should not be entirely disabled (otherwise, following a network failure, it is hard to get all the devices to ever return to the "correct" PLMN). Also, it is worth noting that the use of a large background PLMN search timer probably helps to improve the battery life. This is effected by a Minimum-PeriodSearchTimer leaf in a NAS configuration MO of an MTC device.

Minimising Network Signalling at Inter-PLMN Attach

If an MTC device changes PLMN (for example, in the case of network failure), it could start signalling to the new PLMN in a Routing Area Update (RAU) message or an ATTACH message. For non-high mobility MTC devices, it would seem sensible to reduce the amount of signalling to the new PLMN by:

a) mandating that MTC devices perform an Attach at PLMN change rather than performing an RAU, which may be rejected with a request to perform an Attach (it should be noted that a change of Routing Areas within a set of Equivalent PLMNs would not constitute a PLMN change); and b) mandating that MTC devices perform a PS domain Attach at PLMN change with an International Mobile Subscriber Identity (IMSI) rather than a Packet Temporary Mobile Subscriber Identity (P-TMSI) (this would cut out the processing load associated with IMSI retrieval from the UE); and c) mandating that MTC devices perform the CS domain Location Update (compare with the Attach procedure) at PLMN change with an IMSI rather than a TMSI.

Use of One or More Long Periodic Update Timers

Some initial study of the stage 3 specifications (for example 3GPP TS 24.008) indicates that a non-mobile MTC device is likely to detect a PLMN failure when performing a periodic update (either in the PS domain or in the CS domain). Thus, operators may use "fairly large" values for their periodic timers (for example, in the range of 12 to 25 hours).

There are some consequences to this approach.

a) The MSC desirably commands the CS part of an MTC device to use a Periodic Location Update (PLU) timer different to the broadcast PLU timer (T3212). In turn, this requires an indication from the UE and/or the HSS to the MSC to indicate that this is an MTC device.

b) The SGSN can use existing signalling (as defined in 3GPP TS 24.008) to command the MTC device to use this "fairly large" timer value. However, the SGSN preferably receives an indication from the LIE and/or the Home Subscriber Server (HSS) to indicate that this is an MTC device.

Overload Control in the "Victim" Core Network

Operators may protect their own network from a mass influx of roaming MTC devices by one or more of the following.

A. Monitor on a node at the edge of their network for a sudden ramp-up of signalling to a foreign HLR and do one of the following:

a. return a specific reject cause to temporarily pacify the MTC device (a new cause value may be specified for this purpose in CS and/or PS domains; and b. return a location update accept in order to stop the device retrying, but insert a flag to the SGSN and/or MME to set a specific Periodic Routing area Update (PRU) timer in which the UE should then perform a further Routing Area Update (RAU) or Tracking Area Update (TAU) which then gets rejected (similar behaviour may be supported in the CS domain).

The first Mobile Application Part (MAP) signalling performed by a UE when first attaching to a network is for the authentication vectors. Hence, significant signalling will be transmitted before the Location Area Update (LAU) or RAU or TAU accept or reject can be sent to the MTC device.

B. Add an indication in the first signalling message from the MTC device to the MSC or SGSN or MME to permit the MSC or SGSN or MME to reject the signalling using a specific, cause value that results in the MTC device backing off for a certain period of time.

C. Add an indication in one of the early Radio signalling messages (associated with the mobility management events) from the MTC device to the Base Station (BSC) or Radio Network Subsystem (RNS) eNodeB to permit the RAN to reject the signalling using a specific cause value that results in the MTC device backing off for a certain period of time.

D. Modify the specified UE handling for "fatal" cause values such as the "IMSI unknown in HLR" and "illegal ME" cause values. This is desirable because the "victim" VPLMN might use such cause values and MTC devices seem to have few ways to handle them other than immediately power cycling the radio modem. An MTC device is advantageously allowed to delete the cause value after a period of greater than 24 hours (or possibly a randomly selected period of 24 to 48 hours).

E. Perform the Equipment Identity Register (EIR) query early in the LAU or Attach procedure (for example, before authentication). The EIR can detect an influx of MTC devices by looking at the leading digits of the International Mobile Equipment Identity (IMEI). Alternatively, by supplying the IMSI along with the IMEI, preferably with the extra MTC marker (sent from the MTC device to the MSC or SGSN or MME) from the core network node to the EIR, the EIR can detect problem situations. Then by specifying a new signalling indication from the EIR to the MSC/SGSN/MME, the core network can then reject the MTC device appropriately (e.g. with some form of 'wait time'). Sharing of information between operators in the 'visited' country may permit the EIRs to respond with information about whether any (or none) of the PLMNs within the visited country have capacity for the UE. This can be used to adapt the 'reject cause' sent from the MSC or SGSN or MME to the MTC device so that further PLMN changes do or do not occur (for example, to avoid that rejection by the first alternative operator leads to overload in the second alternative operator).

F. Inter-operator 'publication' (and utilisation) of IMSI sub-ranges beyond the PLMN-ID assists VPLMNs in providing different treatment for masses of 'low usage MTC' devices compared to more beneficial roaming traffic.

Improved Gs Interface for MTC Devices

To limit signalling from MTC devices, a new broadcast indication is used to cause MTC devices to perform combined PS-CS mobility management via the SGSN (or MME)

while leaving legacy devices to perform separate CS and PS domain mobility management. Consequently, the Gs interface between the SGSN and MTC is optimised for MTC devices when appropriate. The SGSN can then select an MSC optimised for high capacity or MTC devices to handle any large influx of devices (for example, as a result of an MTC indicator from the device, the HSS or both).

An advantage of such a new Network Mode of Operation is that the 'quality of experience' of legacy CS domain devices would be maintained. In addition, this might reduce the number of software updates (for example, for a variable PLU timer) that would otherwise need to be made to the MSC.

Although embodiments of the invention have been described above, the skilled person may contemplate various modifications.

The skilled person will appreciate that the transmitter and receiver in the base station, MTC devices or both may be embodied in an integrated transceiver.

The invention claimed is:

1. A method of controlling access by a roaming Machine-Type Communication, MTC, device to a cellular radio network, the roaming MTC device having an associated Home Public Land Mobile Network, HPLMN, the method comprising:
   sending, from the roaming MTC device, a message to the cellular radio network, the message including an identification that specifically identifies the roaming MTC device as a MTC device to the cellular radio network, the identification further identifying that the roaming MTC device is a low throughput device that includes a high delay tolerance for messages transmitted by the roaming MTC device, the roaming MTC device being an unanticipated MTC device in the cellular radio network, the roaming MTC device comprising a MTC device that is configured to switch between use of multiple different cellular radio networks;
   receiving an instruction at the roaming MTC device transmitted by the cellular radio network not to make a transmission from the roaming MTC device for accessing the cellular radio network, the instruction specifying a criteria for the roaming MTC device's HPLMN or a preferred list of cellular networks;
   comparing, at the roaming MTC device, the criteria specified by the instruction with the HPLMN associated with the roaming MTC device or the preferred list of cellular networks; and
   avoiding making a transmission from the roaming MTC device to access the cellular radio network for a period of time based on the result of the step of comparing.

2. The method of claim 1, wherein the criteria specifies one or more of: that the cellular radio network is the HPLMN associated with the roaming MTC device; that the cellular radio network is an equivalent of the HPLMN associated with the roaming MTC device; and that the preferred list of cellular networks associated with the roaming MTC device comprises the cellular radio network.

3. The method of claim 1, wherein the criteria bars access to the network to non-roaming MTC devices.

4. The method of claim 1, wherein the criteria permits access to the network only to non-roaming MTC devices.

5. The method of claim 1, wherein the criteria is encoded in 2 bits of data.

6. The method of claim 5, wherein the 2 bits specify that access be permitted to one of: (i) only MTC devices having an associated HPLMN the same as the cellular radio network; (ii) only MTC devices having an associated HPLMN the same as the cellular radio network and MTC devices having an associated HPLMN equivalent to the cellular radio network; (iii) only MTC devices having an associated HPLMN the same as the cellular radio network, MTC devices having an associated HPLMN equivalent to the cellular radio network and MTC devices with the cellular radio network on the preferred list of cellular networks; and (iv) all devices.

7. The method of claim 1, wherein the instruction is transmitted by the cellular radio network on a GERAN System Information Type 3 or Type 1 message.

8. The method of claim 7, wherein the instruction is transmitted by the cellular radio network on a GERAN System Information Type 3 or Type 1 Rest Octets information element.

9. The method of claim 1, wherein the roaming MTC device is a low throughput device that is configured to transmit no more than 1 MB of data per day.

10. The method of claim 9, wherein the roaming MTC device transmits 500 kB of data per day.

11. A non-transitory computer-readable medium having stored thereon, program instructions that, when executed on a computer, cause the computer to:
   cause a roaming MTC device to send a message to a cellular radio network, the message including an identification that specifically identifies the roaming MTC device as a MTC device to the cellular radio network, the identification further identifying that the roaming MTC device is a low throughput device that includes a high delay tolerance for messages transmitted by the roaming MTC device, the roaming MTC device being an unanticipated MTC device in the cellular radio network, the roaming MTC device comprising a MTC device that is configured to switch between use of multiple different cellular radio networks;
   receive an instruction transmitted by the cellular radio network at the roaming MTC device not to make a transmission from the roaming MTC device for accessing the cellular radio network, the instruction specifying a criteria for a Home Public Land Mobile Network, HPLMN, of the roaming MTC device or a preferred list of cellular networks;
   compare, at the roaming MTC device, the criteria specified by the instruction with the HPLMN associated with the roaming MTC device or the preferred list of cellular networks; and
   avoid making a transmission from the roaming MTC device to access the cellular radio network for a period of time based on the result of the step of comparing.

12. A roaming Machine-Type Communication, MTC, device having a Home Public Land Mobile Network, HPLMN, comprising:
   a transmitter, the transmitter being usable to send a message from the roaming MTC device to a cellular radio network, the message including an identification that specifically identifies the roaming MTC device as a MTC device to the cellular radio network, the identification further identifying that the roaming MTC device is a low throughput device that includes a high delay tolerance for messages transmitted by the roaming MTC device, the roaming MTC device being an unanticipated MTC device in the cellular radio network, the roaming MTC device comprising a MTC device that is configured to switch between use of multiple different cellular radio networks;
   a receiver configured to receive an instruction transmitted by the cellular radio network not to make a transmission from the roaming MTC device for accessing the cellular radio network, the instruction specifying a criteria for the roaming MTC device's HPLMN or a preferred list of cellular networks; and a processor configured to compare the criteria specified by the instruction with the HPLMN associated with the roaming MTC device or the preferred list of cellular networks and to control the transmitter not to make a transmission to access the cellular radio network for a period of time based on the comparison.

13. The roaming MTC device of claim 12, wherein the processor is configured to cause the roaming MTC device to self-configure as a low usage MTC device, the roaming MTC device self-configuring by storing a non-access stratum (NAS) signalling priority at the roaming MTC device.

14. The roaming MTC device of claim 12, wherein the roaming MTC device was previously registered with a different cellular radio network prior to registering with the cellular radio network, and wherein, when the roaming MTC device registered with the cellular radio network, the processor caused the roaming MTC device to:
perform an attach procedure without performing a routing area update; and
perform either (1) a packet switch domain attach procedure or (2) a circuit switch domain location update procedure.

15. The roaming MTC device of claim 14, wherein the processor causes the roaming MTC device to perform the circuit switch domain location update procedure, and wherein the circuit switch domain location update procedure is performed using an international mobile subscriber identity (IMSI) of the roaming MTC device.

16. The roaming MTC device of claim 12, wherein the processor is further configured to wait at least a minimum time period before searching for a different HPLMN to replace the roaming MTC device's HPLMN.

17. A method of controlling access by a roaming Machine-Type Communication, MTC, device to a cellular radio network, the roaming MTC device having an associated Home Public Land Mobile Network, HPLMN, the method comprising:
receiving, from the roaming MTC device, a message that includes an identification that specifically identifies the roaming MTC device as a MTC device to the cellular radio network, the identification further identifying that the roaming MTC device is a low throughput device that includes a high delay tolerance for messages transmitted by the roaming MTC device, the cellular radio network initially not anticipating an arrival of the roaming MTC device, the roaming MTC device being configured to use at least one cellular radio network that is different from the cellular radio network; and
transmitting an instruction from the cellular radio network not to make a transmission from the roaming MTC device for accessing the cellular radio network, the instruction specifying a criteria for the roaming MTC device's HPLMN or a preferred list of cellular networks, such that the roaming MTC device can compare the criteria specified by the instruction with the HPLMN associated with the roaming MTC device or the preferred list of cellular networks and avoid making a transmission from the roaming MTC device to access the cellular radio network for a period of time based on the comparison.

* * * * *